(12) United States Patent
Huang et al.

(10) Patent No.: US 8,259,883 B2
(45) Date of Patent: Sep. 4, 2012

(54) TIMING RECOVERY CIRCUIT AND METHOD THEREOF

(75) Inventors: Liang-Wei Huang, Taipei (TW); Chih-Yung Shih, Taipei (TW); Shieh-Hsing Kuo, Taipei (TW)

(73) Assignee: Realtek Semiconductor Corp., Hsinchu (TW)

( * ) Notice: Subject to any disclaimer, the term of this patent is extended or adjusted under 35 U.S.C. 154(b) by 739 days.

(21) Appl. No.: 12/346,855

(22) Filed: Dec. 31, 2008

(65) Prior Publication Data

US 2009/0168934 A1    Jul. 2, 2009

(30) Foreign Application Priority Data

Jan. 2, 2008   (TW) ................................ 97100029 A

(51) Int. Cl.
*H04L 7/00*    (2006.01)
(52) U.S. Cl. ....................................................... 375/354
(58) Field of Classification Search .................. 375/354, 375/357, 369, 372, 373, 374; 370/395.62, 370/507; 455/265; 702/89; 713/375, 400
See application file for complete search history.

(56) References Cited

U.S. PATENT DOCUMENTS

| 6,996,230 | B1 * | 2/2006 | Chu et al. ................. 379/406.08 |
| 7,187,739 | B2 | 3/2007 | Ma |
| 2005/0249275 | A1 | 11/2005 | Yen et al. |
| 2008/0049146 | A1 * | 2/2008 | Choi et al. ..................... 348/726 |

* cited by examiner

*Primary Examiner* — Khanh C Tran
(74) *Attorney, Agent, or Firm* — Thomas, Kayden, Horstemeyer & Risley, LLP

(57) ABSTRACT

In the implementation of timing recovery in conventional communication systems, significant errors are generated from modulo operations under certain extreme conditions by taking input signals of a slicer as datum points. In order to prevent such errors, the input signal of a modulo processing circuit is taken as the datum point in place of the input signal of a slicer. This technique could also be applied to communication systems adopting the minimum mean-square error algorithm, the zero-forcing algorithm, or other relevant algorithms.

12 Claims, 6 Drawing Sheets

TIMING RECOVERY CIRCUIT AND METHOD THEREOF

BACKGROUND OF THE INVENTION

1. Field of the Invention

The present invention relates to a timing recovery circuit and a timing recovery method, and more particularly, to a timing recovery circuit and a timing recovery method of taking a modulo input signal as a datum point for implementing timing recovery.

2. Description of the Prior Art

In certain communication systems, a technique named Tomlinson-Harashima precoding (THP) is utilized at the transmitting terminals of the communication systems for implementing timing recovery. For example, THP may be utilized in communication systems based on 10G Base-T Ethernet applied with IEEE 802.3an. THP includes placing a feedback filter of a decision feedback equalizer at a transmitting terminal of a communication system instead of at a receiving terminal of the communication system for reducing error propagation resulted from symbol errors of a slicer in advance. However, for restricting symbol values of signals at the transmitting terminal so as to reduce symbol errors, a modulo processing circuit is further disposed at the transmitting terminal for implementing such restrictions. Note that a weighted modulo of the modulo processing circuit is 2M, where M is a modulo. Therefore, an output signal Tx_output at the transmitting terminal may be indicated as follows:

$$Tx\_output = (FIR\_output + M) \bmod (2M) - M \qquad (1)$$

where FIR_output indicates a symbol value of finite impulse response (FIR) in the feedback equalizer. Considering the abovementioned 10G Base-T Ethernet, when the feedback equalizer is assumed to take FIR of 16 taps, a value of the corresponding modulo M is 16, and the output signal Tx_output at the transmitting terminal may be indicated as follows:

$$Tx\_output = (FIR\_output + 16) \bmod (32) - 16 \qquad (2)$$

Since the modulo processing circuit having the modulo value 2M has been applied at the transmitting terminal of the communication system, another modulo processing circuit having the modulo value 2M is also required to be applied before a slicer of the receiving terminal of the communication system for recovering transmitted signals of the transmitting terminal. However, an obvious fault may easily happen in the communication system utilizing THP. Since the communication system utilizing THP represents signals with a pulse amplitude modulation (PAM) based on a value 16, i.e., PAM 16, symbol values of the represented signals include ±1, ±3, ±5, ±7, ±9, ±13, ±15. When a transmitted signal having a symbol value of +15 is interfered by noises in the channel so that a corresponding received signals has a symbol value of 16.5, a recovered signal having a symbol value of −15 is retrieved from the slicer after obtaining a symbol value of 15.5 according to the equation (2). In other words, since the noises in the channel merely results in a shift symbol value of +1.5 on the transmitted signal, a shift symbol value in the recovered signal is significantly raised to −30 because THP is utilized in both the transmitting terminal and the receiving terminal of the communication system. A probability that the symbol value +15 happens in the signal is ⅛, therefore, a huge amount of symbol errors appears accordingly while mass communication and related timing recovery is performed. In conclusion, symbol errors of ±2·(M−1) are easily resulted while THP, which takes input signals of a slicer as datum points, is utilized for implementing timing recovery. And as a consequence, the implemented timing recovery cannot precisely synchronize signals at the receiving terminal with the signals at the transmitting terminal. And even in certain related prior arts, signals having the symbol value ±2·(M−1) are directly eliminated in the modulo processing circuit having a modulo value 2M, however, the eliminated signals results in aliasing of larger degrees as well.

SUMMARY OF THE INVENTION

The claimed invention discloses an apparatus for timing recovery, applied to a communication system. The apparatus comprises a modulo processing circuit, a slicer, and a de-modulo processing circuit. The modulo processing circuit receives a modulo input signal to perform a modulo operation. The slicer is coupled to the modulo processing circuit for rounding an output signal of the modulo processing circuit into an integer signal. The de-modulo processing circuit is coupled to the slicer for performing a de-modulo operation on the output signal of the slicer to generate a de-modulo output signal. The de-modulo operation indicates an inverse function of the modulo operation.

The claimed invention discloses a method for timing recovery, applied to a timing recovery circuit. The method comprises: receiving a modulo input signal, performing a modulo operation to generating a modulo output signal according to the input signal, rounding the modulo output signal to generate an integer signal, performing a de-modulo operation to generate a de-modulo output signal according to the integer signal, determining a difference between the modulo input signal and the de-modulo output signal to output an error signal, and performing timing recovery according to the error signal. The de-modulo operation indicates an inverse function of the modulo operation.

The claimed invention discloses a timing recovery circuit utilized in a communication system. The timing recovery circuit comprises a slicer and a modulo processing circuit. The slicer receives an input signal, and generates a slicer output signal having a value of ±2k+1, wherein k is a non-negative integer. The modulo processing circuit receives the slicer output signal for performing a modulo operation to generate a modulo output signal.

The claimed invention discloses a timing recovery method utilized in a timing recovery circuit. The timing recovery method comprises receiving an input signal and generating a slicer output signal having a value of ±2k+1, where k is a non-negative integer; receiving the slicer output signal for performing a modulo operation to generate a modulo output signal; receiving an input signal of a slicer and the slicer output signal; calculating a difference between the input signal of the slicer and the slicer output signal for accordingly outputting an error signal; and performing timing recovery according to the error signal.

These and other objectives of the present invention will no doubt become obvious to those of ordinary skill in the art after reading the following detailed description of the preferred embodiment that is illustrated in the various figures and drawings.

DETAILED DESCRIPTION

The present invention discloses an apparatus for timing recovery, which is preferably a timing recovery circuit, and a timing recovery method for taking modulo input signals as datum points to implement timing recovery, and provides a communication system applying the disclosed timing recovery circuit and timing recovery method. According to disclosures of the present invention, the defect, in which errors are generated at the receiving terminal of the communication system because input signals of the slicer are taken as datum points while THP is utilized for implementing timing recovery conventionally, is neutralized.

Figure 1:
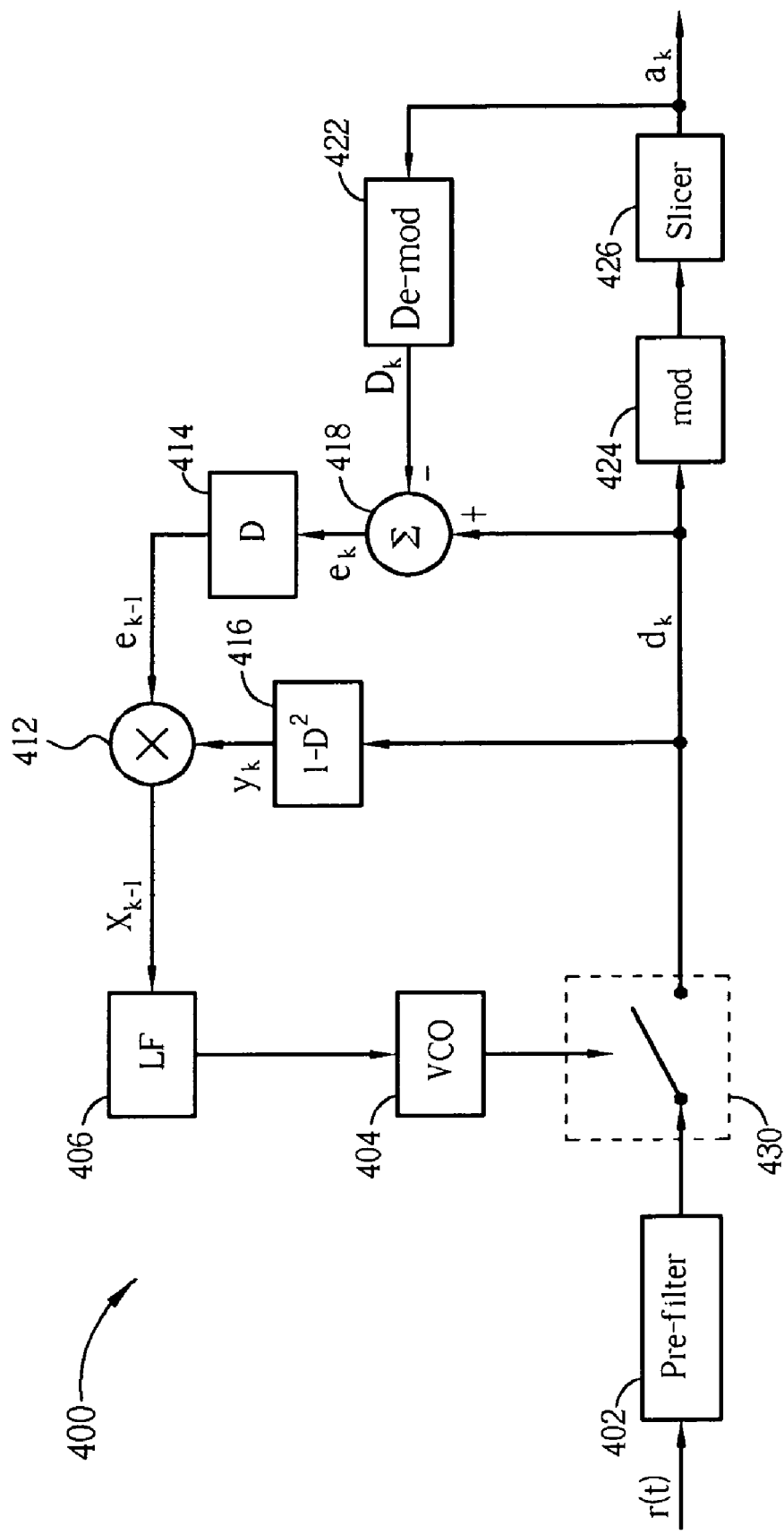
FIG. 1 is a diagram of a communication system, which takes modulo input signals as datum points and applies the Minimum Mean-Square Error algorithm, for implementing timing recovery according to a preferred embodiment of the present invention.

Please refer to FIG. 1, which is a diagram of a communication system 400, which takes modulo input signals as datum points and applies the Minimum Mean-Square Error (MMSE) algorithm, for implementing timing recovery according to a preferred embodiment of the present invention. As shown in FIG. 1, the communication system 400 includes a pre-filter 402, a switch 430, a voltage-controlled oscillator 404, a loop filter 406, a multiplier 412, a first delay unit 414, a second delay unit 416, an adder 418, a modulo processing circuit 424, a slicer 426, and a de-modulo processing circuit 422. Couplings within the communication system 400 are illustrated as shown in FIG. 1 so that the couplings are not described further. As shown in FIG. 1, after a receiver signal r(t) is filtered by the pre-filter 402 in advance, a data signal $d_k$, which is also a soft value since the data signal $d_k$ has not been processed by the slicer 426, may be generated from the switch 430, which is controlled by the voltage-controlled oscillator 404. The modulo processing circuit 424 receives the soft-value data signal $d_k$, which then serves as a modulo input signal for performing a modulo operation. After an output signal of the modulo operation is rounded by the slicer 426, a specific integer signal $a_k$ is outputted, where a value of the integer signal $a_k$ may be $\pm 1$, $\pm 3$, $\pm 5$, $\pm 7$, $\pm 9$, $\pm 11$, $\pm 13$, $\pm 15$ while PAM 16 is used. The de-modulo processing circuit 422 processes the integer signal $a_k$ to generate a de-modulo output signal, which is a data signal $D_k$, and a hard value since the data signal $D_k$ has been processed by the slicer 426. A same value of modulo may be used on both the modulo processing circuit 424 and the de-modulo processing circuit 422, and a function of the de-modulo processing circuit 422 equals an inverse function of a function used in the modulo processing circuit 424. The adder 418 is utilized for calculating a difference between the soft-value data signal $d_k$ and the hard-value data signal $D_k$ so as to retrieve an error signal $e_k$. The first delay unit 414 receives the error signal $e_k$ so as to generate an error signal $e_{k-1}$. The second delay unit 416 receives the soft-value data signal $d_k$ so as to generate a soft-value data signal $y_k$. Note that a function of the first delay unit 414 indicates a first delay operator D, which indicates delay of one single symbol period, whereas a function of the second delay unit 416 indicates a second delay operator $1-D^2$. The multiplier 412 receives the error signal $e_{k-1}$ generated according to the first delay operator D and the soft-value data signal $y_k$ generated according to the second delay operator $1-D^2$, and substantially multiplies the received signals to generate a product signal $X_{k-1}$. Note that the product signal $X_{k-1}$ may be generated with the aid of a bunch of available techniques, and the substantial multiplications may be implemented with sinusoidal functions or logarithmic functions while a number of bits of the product signal $X_{k-1}$ is required to be decreased. Moreover, the above-listed available functions are known by those who are skilled in the related art so that related principles are not described further herein. The loop filter 406 inputs the product signal $X_{k-1}$ into the voltage-controlled oscillator 404 for implementing timing recovery.

Figure 2:
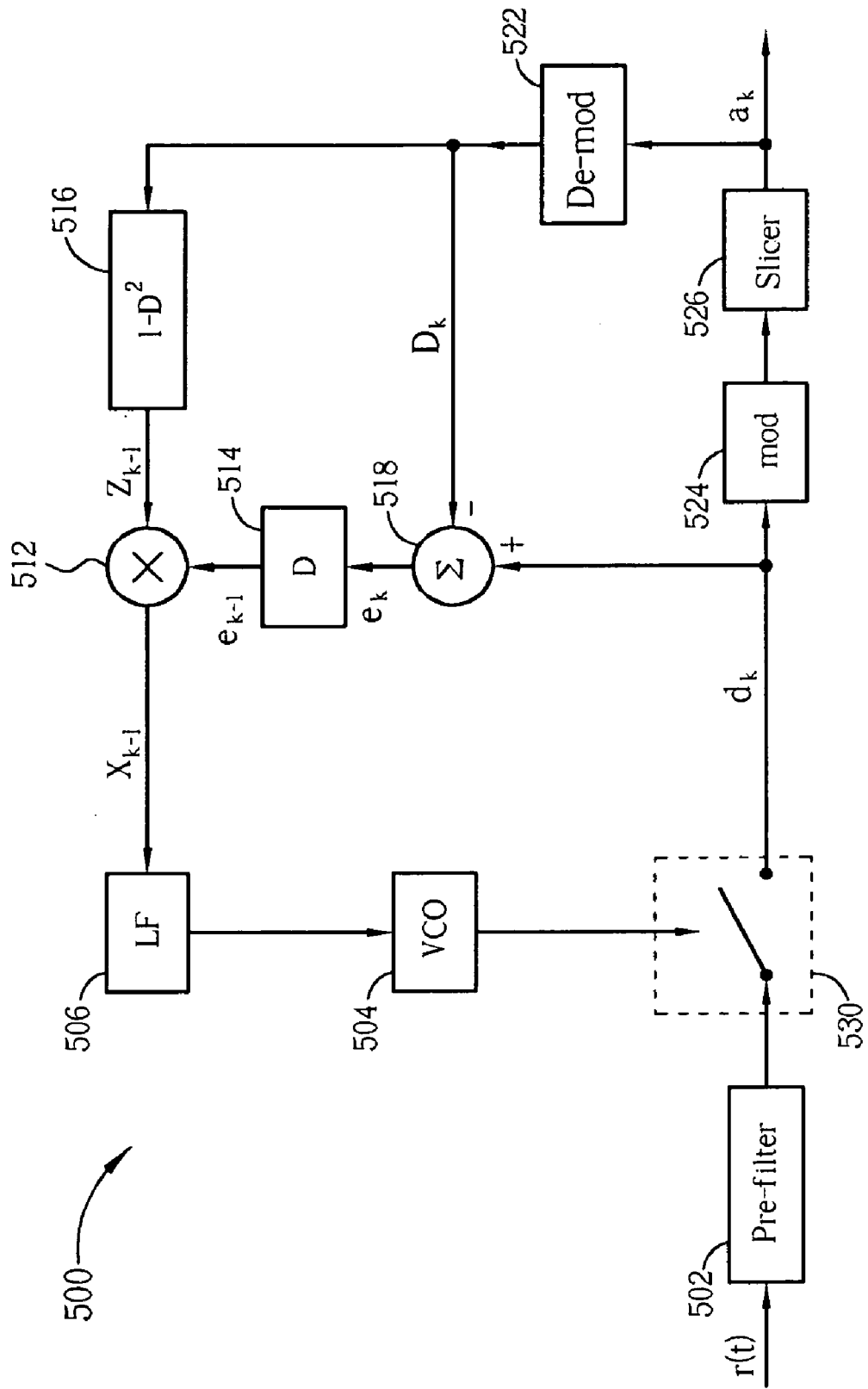
FIG. 2 is a diagram of a communication system, which takes modulo input signals as datum points and applies the Zero-Forcing algorithm, for implementing timing recovery according to a preferred embodiment of the present invention.

Please refer to FIG. 2, which is a diagram of a communication system 500, which takes modulo input signals as datum points and applies the Zero-Forcing algorithm, for implementing timing recovery according to a preferred embodiment of the present invention. As shown in FIG. 2, the communication system 500 includes a pre-filter 502, a switch 530, a voltage-controlled oscillator 504, a loop filter 506, a multiplier 512, a first delay unit 514, a second delay unit 516, an adder 518, a modulo processing circuit 524, a slicer 526, and a de-modulo processing circuit 522. Couplings of the communication system 500 are illustrated in FIG. 2 so that the couplings are not described for brevity. Operations of elements included in the communication system 500 are similar with those included in the communication system 400 illustrated in FIG. 1. A primary difference between the communication systems 500 and 400 lies in the fact that the second delay unit 516 shown in FIG. 2 receives the hard-value data signal $D_k$ and generates a hard-value data signal $Z_{k-1}$ according to the second delay operator $1-D^2$. The multiplier 512 receives both the error signal $e_{k-1}$ generated according to the first delay operator D and the hard-value data signal $Z_{k-1}$, and substantially multiplies the received signals so as to generate a product signal $X_{n-1}$. Note that available techniques in generating the product signal $X_{n-1}$ are similar with those discussed in FIG. 1 so that the available techniques are not described further.

Primary characteristics of both the communication systems 400 and 500 lie in the fact that the THP and a feedback mechanism are implemented with the aid of the modulo processing circuits 424 and 524, the slicers 426 and 526, and the de-modulo processing circuits 422 and 522 so that input datum points of the THP are shifted from input terminals of both the slicers 426 and 526 to input terminals of the modulo processing circuits 424 and 524 respectively. In a preferred embodiment of the present invention, values of output signals of both the slicers 426 and 526 may be indicated by $\pm 2*M*k$, where k is an arbitrary non-negative integer.

Besides the abovementioned embodiments, in still other embodiments of the present invention, the modulo processing circuit may also be disposed after the slicer, and the output signal of the slicer may also be directly inputted to the adder in a feedback manner, where the other embodiments are illustrated in FIG. 1 and FIG. 2. Please refer to FIG. 3, the communication system 600 includes a pre-filter 602, a switch 630, a voltage-controlled oscillator 604, a loop filter 606, a multiplier 612, a first delay unit 614, a second delay unit 616, an adder 618, a slicer 620, and a modulo processing circuit 624. A primary characteristic of the communication system 600 lies in the fact that when the communication system 600 is utilized for 10G Base-T Ethernet, a value of an output signal of the slicer 620 is ±2k+1, where k is a non-negative integer. Since the value of the output signal of the slicer 620 merely follows the value of the variable k, possible errors in the prior art may thereby be avoided while timing recovery is implemented. The communication system 700 illustrated in FIG. 4 is similar with the communication system 500 shown in FIG. 2. A modulo processing circuit 724 is coupled to the slicer 720 after the slicer 720, whereas the modulo processing circuit 524 is coupled to the slicer 526 before the slicer 526. Since included elements and couplings of the communication system 700 are similar with those of the communication system 500 shown in FIG. 2, the included elements and the couplings of the communication system 700 are not described further.

Figure 5:
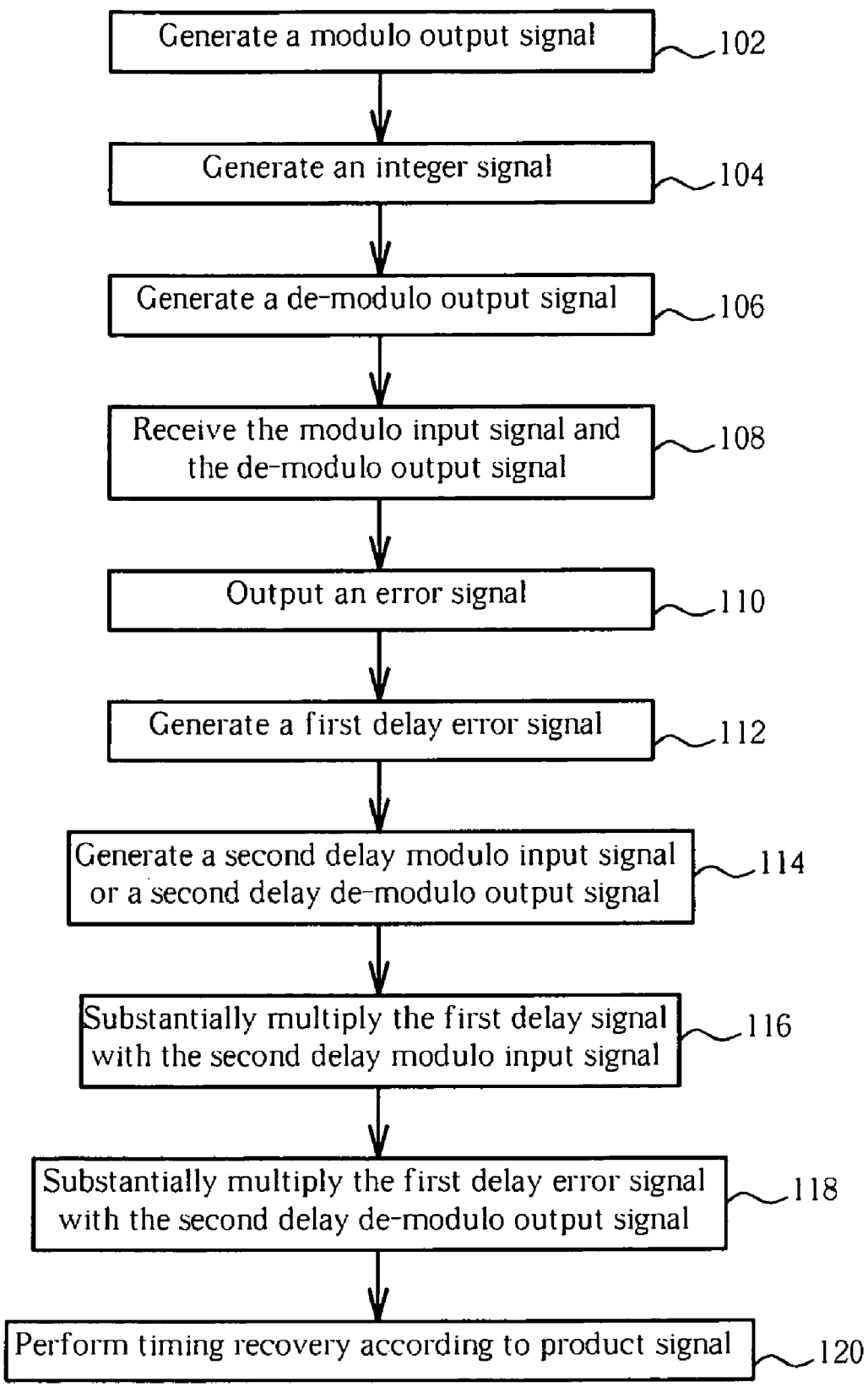
FIG. 5 is a flowchart of the timing recovery method utilized in both embodiments shown in FIG. 1 and FIG. 2 and disclosed in the present invention.

Please refer to FIG. 5, which is a flowchart of the timing recovery method utilized in both embodiments shown in FIG. 1 and FIG. 2 and disclosed in the present invention. The timing recovery method shown in FIG. 5 includes steps as follows:

Step 102: Receive a modulo input signal for performing a modulo operation to generate a modulo output signal.

Step 104: Receive the modulo output signal for rounding the modulo output signal to generate an integer signal.

Step 106: Receive the integer signal for performing a de-modulo operation to generate a de-modulo output signal.

Step 108: Receive the modulo input signal and the de-modulo output signal.

Step 110: Calculate a difference between the modulo input signal and the de-modulo output signal to accordingly output an error signal.

Step 112: Receive the error signal for executing a first delay equation to generate a first delay error signal.

Step 114: Receive the modulo input signal or the de-modulo output signal for executing a second delay equation to generate a second delay modulo input signal or a second delay de-modulo output signal.

Step 116: Substantially multiply the first delay signal with the second delay modulo input signal to generate a product signal if the error signal and the modulo input signal are received.

Step 118: Substantially multiply the first delay error signal with the second delay de-modulo output signal to generate the product signal if the error signal and the de-modulo output signal are received.

Step 120: Perform timing recovery according to the product signal.

The timing recovery method illustrated in FIG. 5 is a summary of operations of communication systems described in the embodiments shown in FIG. 1 and FIG. 2, and related details of the operations have been explained so that the related details are not described further. Note that combinations and permutations of the steps shown in FIG. 5 should not be limitations to the present invention. Also note that the de-modulo operation described in the timing recovery method of FIG. 5 indicates an inverse function of the modulo operation described in FIG. 5 as well.

Figure 3:
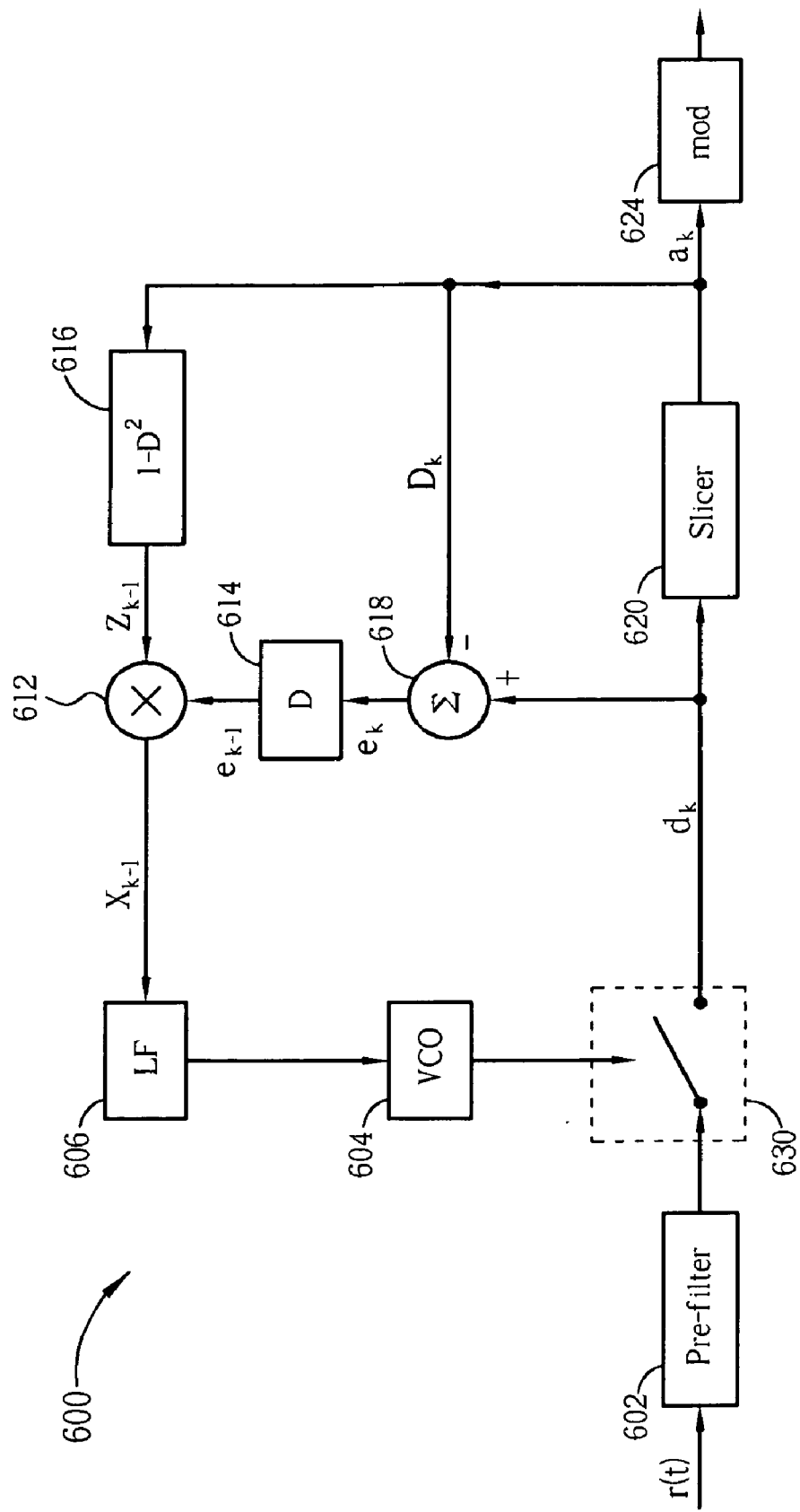
FIG. 3 is a diagram of another communication system formed by coupling the modulo processing circuit of the communication system shown in FIG. 1 after the slicer.
Figure 4:
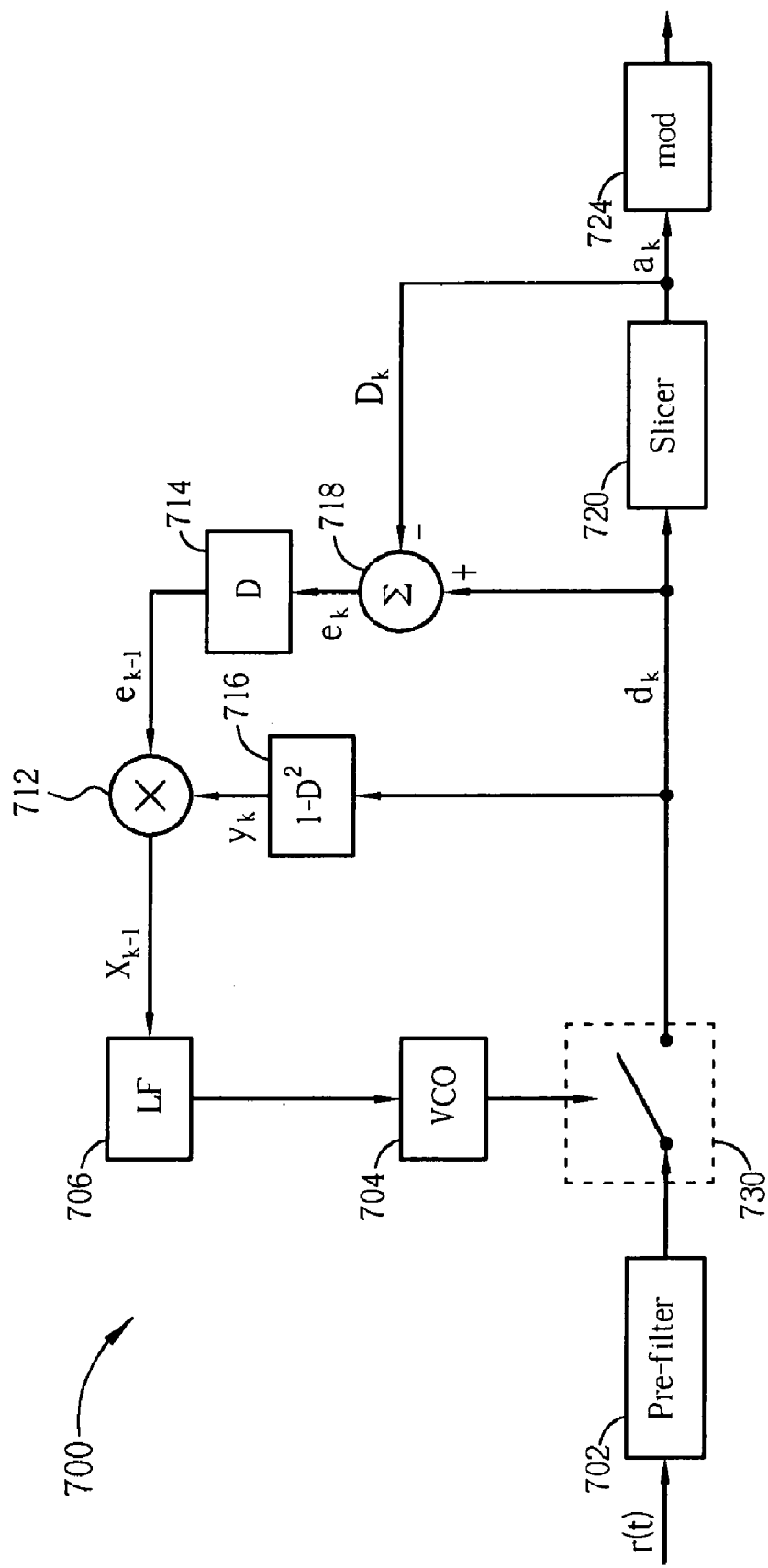
FIG. 4 is a diagram of another communication system formed by coupling the modulo processing circuit of the communication system shown in FIG. 2 after the slicer.
Figure 6:
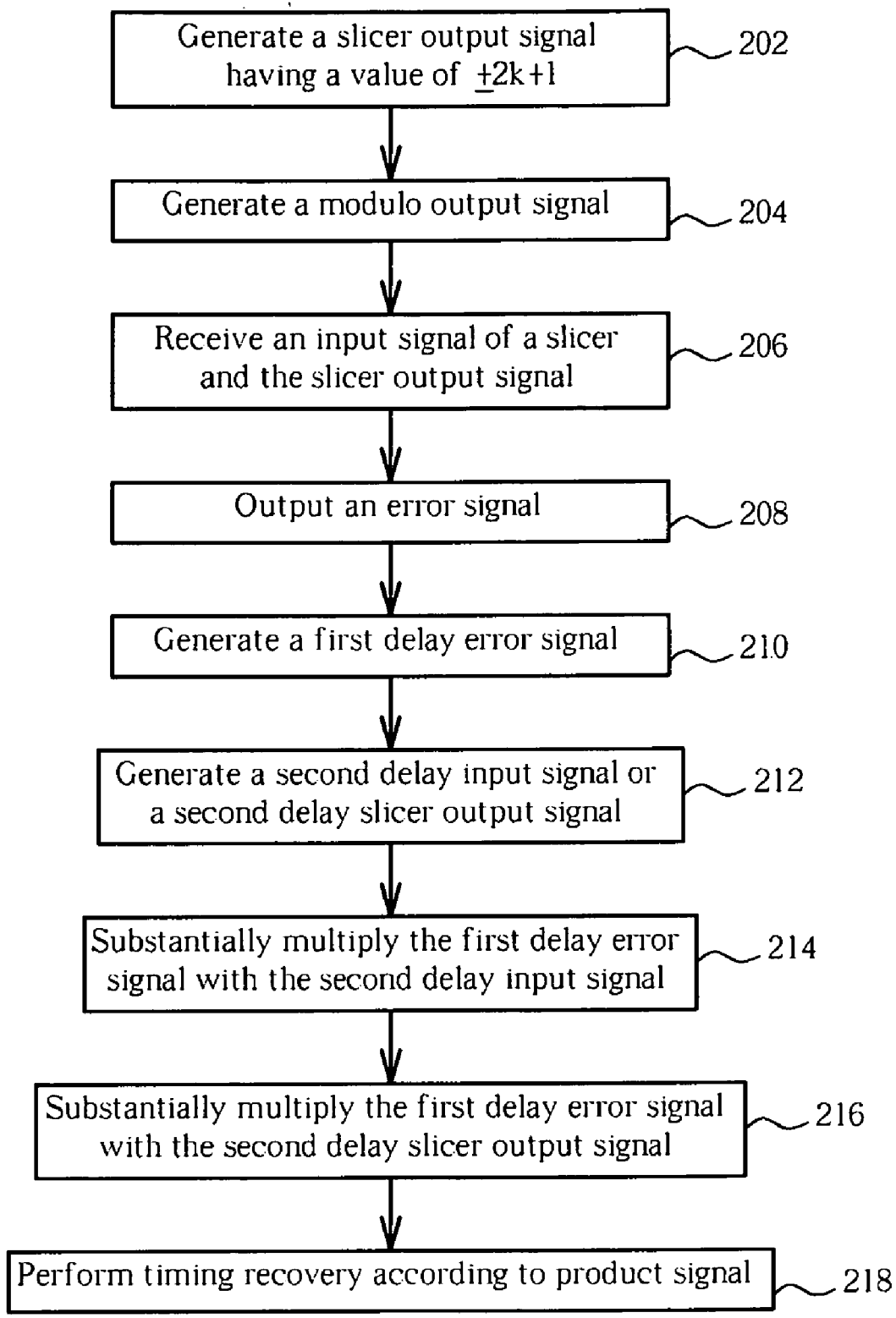
FIG. 6 is a flowchart of the timing recovery method applied in embodiments shown in FIG. 3 and FIG. 4 and disclosed in the present invention.

Please refer to FIG. 6, which is a flowchart of the timing recovery method applied in embodiments shown in FIG. 3 and FIG. 4 and disclosed in the present invention. The timing recovery method illustrated in FIG. 6 includes steps as follows:

Step 202: Receive an input signal and generate a slicer output signal having a value of ±2k+1, where k is a non-negative integer.

Step 204: Receive the slicer output signal for performing a modulo operation to generate a modulo output signal.

Step 206: Receive an input signal of a slicer and the slicer output signal.

Step 208: Calculate a difference between the input signal of the slicer and the slicer output signal for accordingly outputting an error signal.

Step 210: Receive the error signal for executing a first delay equation and generate a first delay error signal.

Step 212: Receive the input signal of the slicer or the slicer output signal for executing a second delay equation, and generate a second delay input signal or a second delay slicer output signal.

Step 214: Substantially multiply the first delay error signal with the second delay input signal for generating a product signal if the error signal and the input signal of the slicer are received.

Step 216: Substantially multiply the first delay error signal with the second delay slicer output signal for generating the product signal if the error signal and the slicer output signal are received.

Step 218: Perform timing recovery according to the product signal.

The timing recovery method illustrated in FIG. 6 is a summary of operations of communication systems described in the embodiments shown in FIG. 3 and FIG. 4, and related details of the operations have been explained so that the related details are not described further. Note that combinations and permutations of the steps shown in FIG. 6 should not be limitations to the present invention.

A timing recovery circuit and a timing recovery method of taking modulo input signals as datum points are disclosed in the present invention. The disclosed timing recovery system and method are applied on communication systems using THP. Therefore, errors and aliasing generated at the receiving terminal and caused by taking input signals of the slicer as datum points are significantly relieved.

For example, one embodiment provides an apparatus for timing recovery, applied to a communication system, comprising: a modulo processing circuit for receiving an input signal for performing a modulo operation; a slicer for rounding an output signal of the modulo processing circuit into an integer signal; and a de-modulo processing circuit coupled to the slicer for performing a de-modulo operation on the output signal of the slicer to generate a de-modulo output signal; wherein the de-modulo operation indicates an inverse function of the modulo operation. In one embodiment, a value of the output signal of the slicer is ±2k+1; and k is a non-negative integer. In one embodiment, a value of the output signal of the modulo processing circuit is ±2*M*k; where M is a modulo of the modulo processing circuit and k is a non-negative integer.

Those skilled in the art will readily observe that numerous modifications and alterations of the device and method may be made while retaining the teachings of the invention.

What is claimed is:

1. An apparatus for timing recovery, applied to a communication system, comprising:
   a modulo processing circuit for receiving an input signal for performing a modulo operation;
   a slicer for rounding an output signal of the modulo processing circuit into an integer signal;
   a de-modulo processing circuit coupled to the slicer for performing a de-modulo operation on the output signal of the slicer to generate a de-modulo output signal;
   wherein the de-modulo operation indicates an inverse function of the modulo operation;

wherein a value of the output signal of the modulo processing circuit is $\pm .2*M*k$; M is a modulo of the modulo processing circuit; and k is a non-negative integer; and
circuitry configured to use the value in a timing recovery operation.

2. A method for timing recovery, applied to a timing recovery circuit comprising:
receiving an input signal;
performing a modulo operation to generate a modulo output signal according to the input signal;
rounding the modulo output signal to generate an integer signal;
performing a de-modulo operation to generate a de-modulo output signal according to the integer signal;
determining a difference between the input signal and the de-modulo output signal to output an error signal; and
performing timing recovery according to the error signal;
wherein the de-modulo operation indicates an inverse function of the modulo operation.

3. The method of claim 2 wherein a value of the integer signal is $\pm 2k+1$; and k is a non-negative integer.

4. The method of claim 2, further comprising:
receiving the error signal for executing a first delay equation to generate a first delay error signal;
receiving the modulo input signal or the de-modulo output signal for executing a second delay equation to generate a second delay modulo input signal or a second delay de-modulo output signal;
multiplying the first delay signal with the second delay modulo input signal to generate a product signal if the error signal and the modulo input signal are received; and
multiplying the first delay error signal with the second delay de-modulo output signal to generate the product signal if the error signal and the de-modulo output signal are received;
wherein the step of performing timing recovery is performed according to the error signal.

5. The method of claim 4 wherein the first delay equation is a delay variable D, the second delay equation is $1-D^2$, and the delay variable D indicates delay of one single symbol period.

6. An apparatus for timing recovery, applied to a communication system, comprising:
a modulo processing circuit for receiving an input signal for performing a modulo operation;
a slicer for rounding an output signal of the modulo processing circuit into an integer signal; and
a de-modulo processing circuit coupled to the slicer for performing a de-modulo operation on the output signal of the slicer to generate a de-modulo output signal;
an adder having one input terminal for receiving the modulo input signal and another input terminal for receiving the de-modulo output signal for calculating a difference between the modulo signal and the de-modulo output signal to accordingly output an error signal;
a multiplier for multiplying a plurality of input signals to output a product signal of the plurality of input signals;
a first delay unit for receiving the error signal and for outputting the error signal to a first input terminal of the multiplier; and
a second delay unit for receiving the modulo input signal or the de-modulo output signal, and for outputting the received signal to a second input terminal of the multiplier;
wherein the de-modulo operation indicates an inverse function of the modulo operation.

7. The apparatus of claim 6, wherein a value of the output signal of the slicer is $\pm .2k+1$; and k is a non-negative integer.

8. The apparatus of claim 6, wherein a value of the output signal of the modulo processing circuit is $\pm .2*M*k$; M is a modulo of the modulo processing circuit; and k is a non-negative integer.

9. The apparatus of claim 6, further comprising:
a loop filter and a voltage-controlled oscillator, for implementing timing recovery according to the de-modulo output signal.

10. An apparatus for timing recovery, applied to a communication system, comprising:
a modulo processing circuit for receiving an input signal for performing a modulo operation;
a slicer for rounding an output signal of the modulo processing circuit into an integer signal; and
a de-modulo processing circuit coupled to the slicer for performing a de-modulo operation on the output signal of the slicer to generate a de-modulo output signal;
a loop filter and a voltage-controlled oscillator, for implementing timing recovery according to the de-modulo output signal;
wherein the de-modulo operation indicates an inverse function of the modulo operation.

11. The apparatus of claim 10, wherein a value of the output signal of the slicer is $\pm .2k+1$; and k is a non-negative integer.

12. The apparatus of claim 10, wherein a value of the output signal of the modulo processing circuit is $\pm .2*M*k$; M is a modulo of the modulo processing circuit; and k is a non-negative integer.

* * * * *